(12) United States Patent  
Tsurube

(10) Patent No.: US 8,488,872 B2  
(45) Date of Patent: Jul. 16, 2013

(54) STEREO IMAGE PROCESSING APPARATUS, STEREO IMAGE PROCESSING METHOD AND PROGRAM

(75) Inventor: Tomoyuki Tsurube, Tokyo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/356,810

(22) Filed: Jan. 24, 2012

(65) Prior Publication Data

US 2012/0177285 A1 Jul. 12, 2012

Related U.S. Application Data

(63) Continuation of application No. PCT/JP2011/000912, filed on Feb. 18, 2011.

(30) Foreign Application Priority Data

Nov. 10, 2010 (JP) ................................. 2010-251949

(51) Int. Cl.  
*G06K 9/00* (2006.01)

(52) U.S. Cl.  
USPC ......................................................... 382/154

(58) Field of Classification Search  
USPC ............. 382/103, 154; 348/42, 47, 48, 222.1; 359/462, 463; 396/324; 349/15  
See application file for complete search history.

(56) References Cited

U.S. PATENT DOCUMENTS

| | | | |
|---|---|---|---|
| 7,620,237 B2 * | 11/2009 | Nagaoka et al. | ............... 382/154 |
| 2002/0085747 A1 | 7/2002 | Yoshigahara et al. | |
| 2006/0056727 A1 | 3/2006 | Jones et al. | |

FOREIGN PATENT DOCUMENTS

| | | |
|---|---|---|
| JP | 07-234111 A | 9/1995 |
| JP | 08-278125 A | 10/1996 |
| JP | 10-253351 A | 9/1998 |
| JP | 11-039596 A | 2/1999 |
| JP | 11-125522 A | 5/1999 |
| JP | 2006-91011 A | 4/2006 |
| JP | 2008-096162 A | 4/2008 |

OTHER PUBLICATIONS

International Search Report for PCT/JP2011-000912 dated Oct. 11, 2010.

* cited by examiner

*Primary Examiner* — Jose Couso  
(74) *Attorney, Agent, or Firm* — Pearne & Gordon LLP

(57) ABSTRACT

An imaging device (100) includes: an imaging element (103) obtained by repeatedly arranging a pixel W for entire wavelength band, a W-R pixel for R, a W-G pixel for G, and a W-B pixel for B; a filter (102) configured such that a portion corresponding to the pixel W allows the entire wavelength band of a wavelength band within a certain range to pass and portions corresponding to the W-R pixel, the W-G pixel, and the W-B pixel reflect wavelength bands of corresponding colors, respectively; a reflection amount calculating unit (113) for calculating signal values of R, G, and B by subtracting a value of an image reading signal of each of the W-R pixel, the W-G pixel, and the W-B pixel from a value of an image reading signal of the pixel W.

6 Claims, 6 Drawing Sheets

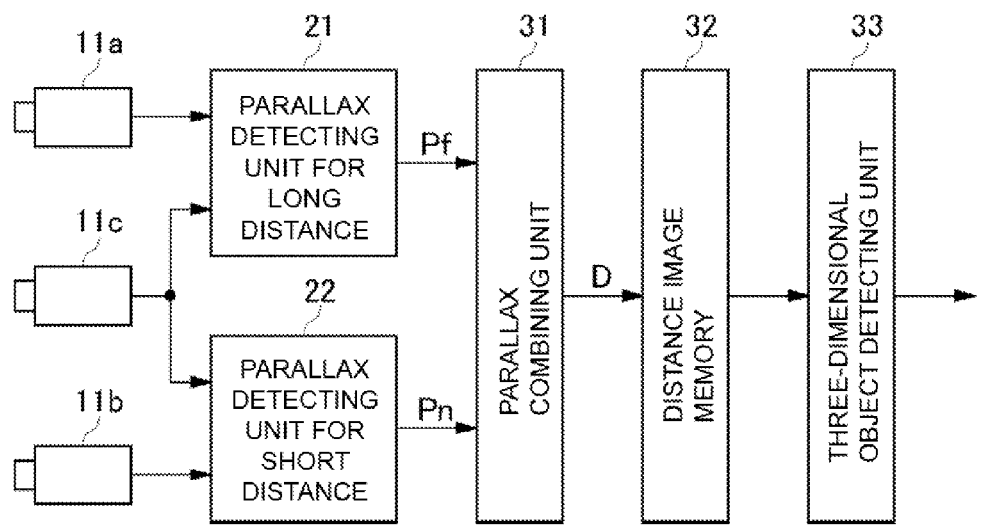
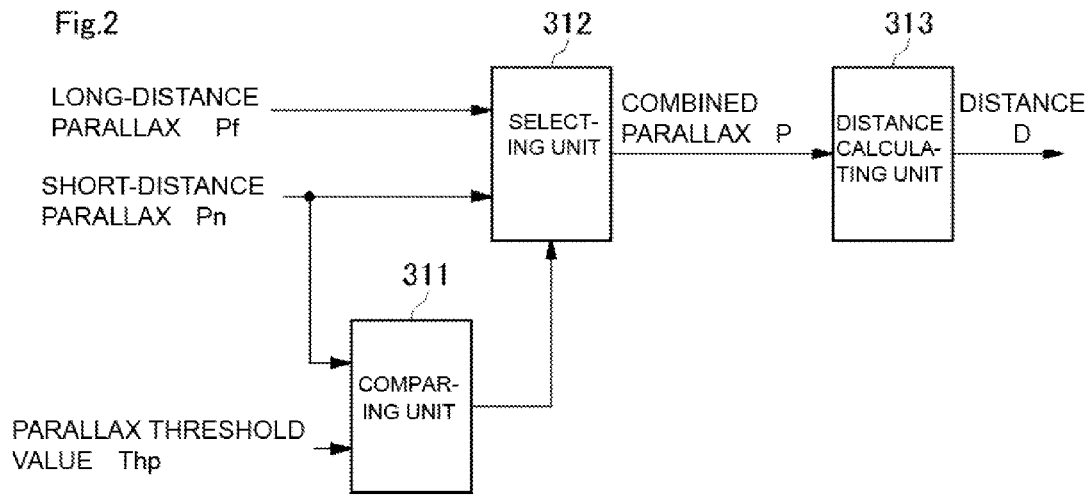

STEREO IMAGE PROCESSING APPARATUS, STEREO IMAGE PROCESSING METHOD AND PROGRAM

RELATED APPLICATION

The present application claims the benefit of Japanese Patent Application No. 2010-251949, filed in Japan on Nov. 10, 2010; the contents of which are incorporated herein by reference.

TECHNICAL FIELD

The present invention relates to an image processing apparatus, an image processing method and a program that use stereo matching.

BACKGROUND ART

As shown in, for example, Patent Literature 1, conventional stereo image processing apparatuses use a plurality of cameras to detect a distance from the cameras to a subject. FIG. 7 is a diagram illustrating a schematic configuration of the conventional image processing apparatuses.

A far three-dimensional object detecting function comprises a distance detecting unit for long distance $1021a$ for CCD cameras for long distance $1011a$ and $1011b$, a distance image memory for long distance $1021b$ for storing distance distribution information, and a far three-dimensional object detecting unit $1030$ for detecting a three-dimensional object based on the distance distribution information. A near three-dimensional object detecting function comprises a distance detecting unit for short distance $1022a$ for CCD cameras for short distance $1012a$ and $1012b$, a distance image memory for short distance $1022b$ for storing distance distribution information, and a near three-dimensional object detecting unit $1031$ for detecting a three-dimensional object based on the distance distribution information. A three-dimensional object combining unit $1032$ organizes and combines data of a three-dimensional object detected by the detecting unit for long distance as well as by the detecting unit for short distance.

CITATION LIST

Patent Literature

[Patent Literature 1]
   Japanese Patent Laid-Open No. 11-39596

SUMMARY OF INVENTION

Technical Problem

However, in the above-described background art, a plurality of distance image memories for long distance and short distance and a plurality of three-dimensional object detecting units for long distance and short distance are required as well as means and a method for combining the data of a three-dimensional object are required, resulting in a larger scale of hardware or software to achieve the apparatus.

An object of the present invention is to provide a stereo image processing apparatus, a stereo image processing method, and a program that can solve such a problem and reduce the scale of hardware or software, obtain distance images of long distance and short distance, and detect a three-dimensional object.

Solution to Problem

A stereo image processing apparatus according to the present invention comprises: a first camera; a second camera; a third camera placed between the first camera and the second camera; a first parallax detecting unit for performing matching between a first image picked up by the first camera and a second image picked up by the second camera to determine correspondence regions in which a difference between image signals is at a minimum for each predetermined unit region and for detecting a deviation between a position in the first image and a position in the second image in the correspondence regions as a first parallax; a second parallax detecting unit for performing matching between a first image picked up by the first camera and a third image picked up by the third camera to determine correspondence regions in which the difference between image signals is at a minimum for each predetermined unit region and for detecting a deviation between a position in the first image and a position in the third image in the correspondence regions as a second parallax; a parallax combining unit for combining the first parallax and the second parallax; and a distance calculating unit for calculating, for each predetermined unit region, a distance to a subject corresponding to the unit region based on the combined parallax.

With employment of this configuration, since the stereo image processing apparatus calculates a distance after combining parallaxes, it is not necessary to prepare image memories for storing a distance determined based on the first parallax and a distance determined based on the second parallax, so that the scale of the hardware can be reduced. Moreover, since it is not necessary to detect a three-dimensional object based on each of a distance image obtained based on the first parallax and a distance image obtained based on the second parallax and to combine the determined three-dimensional objects, the scale of the software can be reduced. It should be noted that since a space between the first camera and the second camera is wider than a space between the first camera and the third camera, a distance to a far three-dimensional object can be determined with higher accuracy based on the first parallax than based on the second parallax, and a distance to a near three-dimensional object can be determined with higher accuracy based on the second parallax than based on the first parallax.

In the stereo image processing apparatus according to the present invention, the parallax combining unit may comprise: a comparing unit for comparing the second parallax with a predetermined threshold value; and a selecting unit for selecting any one of the first parallax and the second parallax based on a comparison result from the comparing unit.

With employment of this configuration, deterioration of the measuring accuracy, that is, deterioration of the detection accuracy can be reduced by changing one parallax to the other if the parallax cannot be detected with accuracy and thereby the measuring accuracy from a long distance through a short distance can be improved.

In the stereo image processing apparatus according to the present invention, the parallax combining unit may comprise: an evaluating unit for acquiring data of the difference between the image signals used when the first parallax is detected by the first parallax detecting unit and for evaluating whether or not the difference between the image signals is equal to or lower than a predetermined threshold value; and a selecting unit for selecting any one of the first parallax and the second parallax based on an evaluation result from the evaluating unit.

With employment of this configuration, the measuring accuracy from a long distance through a short distance can be improved by dynamically changing a parallax to the parallax with the higher measuring accuracy.

A stereo image processing method according to the present invention comprises the steps of: performing matching between a first image picked up by a first camera and a second image picked up by a second camera to determine correspondence regions in which a difference between image signals is at a minimum for each predetermined unit region and detecting a deviation between a position in the first image and a position in the second image in the correspondence regions as a first parallax; performing matching between a first image picked up by the first camera and a third image picked up by a third camera placed between the first camera and the second camera to determine correspondence regions in which the difference between image signals is at a minimum for each predetermined unit region and detecting a deviation between a position in the first image and a position in the third image in the correspondence regions as a second parallax; combining the first parallax and the second parallax; and calculating, for each predetermined unit region, a distance to an object corresponding to the unit region based on the combined parallax.

With employment of this configuration, as with the above-described stereo image processing apparatus according to the present invention, the scale of hardware or the scale of software can be reduced by calculating a distance after combining parallaxes.

In the stereo image processing method according to the present invention, the step of combining parallaxes may comprise the steps of: comparing the second parallax with a predetermined threshold value; and selecting any one of the first parallax and the second parallax based on the comparison result.

With employment of this configuration, deterioration of the measuring accuracy, that is, deterioration of the detection accuracy can be reduced by changing one parallax to the other if the parallax cannot be detected with accuracy and thereby the measuring accuracy from a long distance through a short distance can be improved.

In the stereo image processing method according to the present invention, the step of combining parallaxes may comprise the steps of: acquiring data of the difference between the image signals used when the first parallax is detected in the step of detecting the first parallax; evaluating whether or not the difference between the image signals is equal to or lower than a predetermined threshold value; and selecting any one of the first parallax and the second parallax based on the evaluation result.

With employment of this configuration, the measuring accuracy from a long distance through a short distance can be improved by dynamically changing a parallax to the parallax with the higher measuring accuracy.

A program according to the present invention causes a computer to execute each step of the stereo image processing method described above.

Advantageous Effects of Invention

The present invention has an advantage that the scale of hardware such as distance image memories and software such as a three-dimensional object detecting unit can be reduced and measuring can be performed with accuracy by calculating a distance after combining a first parallax and a second parallax.

As described later, the present invention has another aspect. Therefore, the disclosure of the present invention is intended to provide a part of the present invention and not intended to limit the scope of the invention described and claimed herein.

BRIEF DESCRIPTION OF DRAWINGS

FIG. 1 is a block diagram of a stereo image processing apparatus according to a first embodiment.

FIG. 2 is a block diagram of parallax combining and distance calculating units in the first embodiment.

DESCRIPTION OF EMBODIMENTS

The present invention will be described in detail below. Embodiments described below are only examples of the present invention and the present invention may be changed into various aspects. Therefore, specific configurations and functions disclosed later do not limit the scope of claims.

Now, stereo image processing apparatuses of embodiments according to the present invention will be described with reference to the drawings. It should be noted that the stereo image processing apparatuses comprise dedicated hardware or processors composed of CPUs, and are achieved by programs stored in memories or HDDs.

(First Embodiment)

Figure 4:
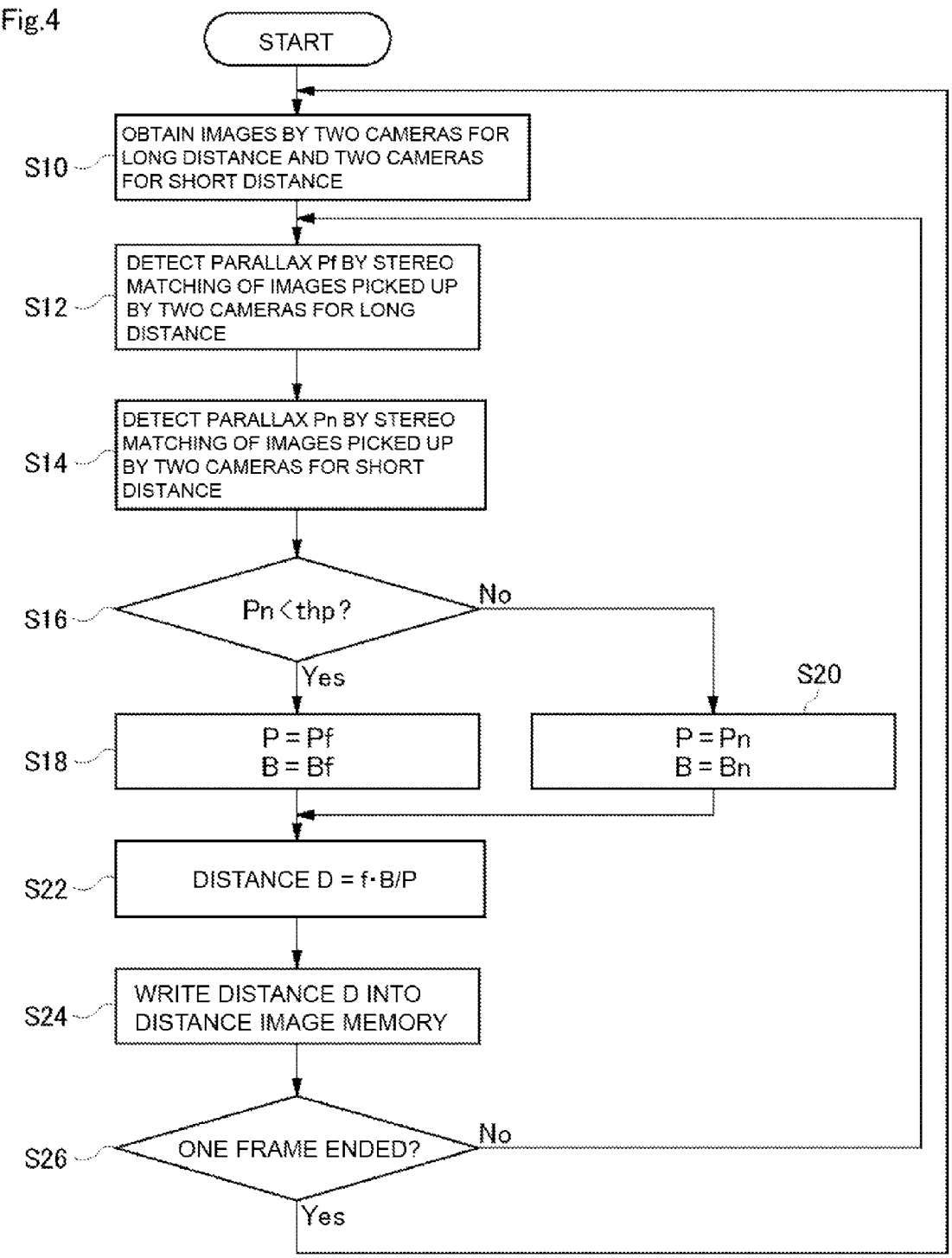
FIG. 4 is a flow chart showing an operation of the stereo image processing apparatus according to the first embodiment.

FIG. 1 is a block diagram illustrating a configuration of a stereo image processing apparatus according to a first embodiment. The stereo image processing apparatus comprises three cameras $11a$ to $11c$, a parallax detecting unit for long distance 21, a parallax detecting unit for short distance 22, a parallax combining unit 31, a distance image memory 32, and a three-dimensional object detecting unit 33. The cameras $11a$ to $11c$ are located on a same level. As shown in FIG. 4 described later, the three cameras $11a$ to $11c$ are arranged on a same base line as well as the camera $11b$ is placed between the camera $11a$ and the camera $11c$. More particularly, the camera $11b$ is placed so that the camera $11b$ is projected on an epipolar line in stereo image picking-up means composed of the camera $11a$ and the camera $11c$. In other words, the camera $11a$ is located on an epipolar line in stereo image picking-up means composed of the camera $11b$ and the camera $11c$.

The parallax detecting unit for long distance 21 performs stereo matching using image signals received from the camera $11a$ and the camera $11c$, carries out long-distance measuring, and determines a long-distance parallax Pf. Since the camera $11a$ and the camera $11c$ have a wider space than a space between the camera $11b$ and the camera $11c$, the stereo image picking-up means composed of the camera $11a$ and the camera $11c$ is suitable to obtain parallax information of a far subject. Therefore, a component to detect a parallax from images taken by the camera $11a$ and the camera $11c$ is called the parallax detecting unit for long distance and the parallax obtained thereby is called the long-distance parallax Pf.

The stereo matching determines a unit region in which difference between image signals is at a minimum for each predetermined unit region in two images to be compared with each other. That is, a region in which a same subject is reflected is detected. In the present embodiment, a pixel is used as a unit region.

The parallax detecting unit for short distance 22 performs stereo matching using image signals received from the camera 11b and the camera 11c, carries out short-distance measuring, and determines a short-distance parallax Pn. The parallax detecting unit for long distance 21 and the parallax detecting unit for short distance 22 input data of the determined parallaxes Pf and Pn into the parallax combining unit 31.

The parallax combining unit 31 has a function to combine the data of the input parallaxes Pf and Pn and calculate a distance D to a subject corresponding to each pixel reflected in both the images. The parallax combining unit 31 successively determines a distance to each point within a range of imaging and stores the distance in the distance image memory 32. Thereby, a distance image is composed. It should be noted that the distance image is an image having a distance value from a camera to a subject in a real environment.

The three-dimensional object detecting unit 33 has a function to detect a three-dimensional object based on a distance image read out from the distance image memory 32.

FIG. 2 is a block diagram illustrating a detailed configuration of the parallax combining unit 31. The parallaxes Pf and Pn are input to a selecting unit 312 for combining parallaxes. A comparing unit 311 compares the short-distance parallax Pn detected by the parallax detecting unit for short distance 22 with a threshold value Thp, and inputs a comparison result to the selecting unit 312. The selecting unit 312 determines any one of the long-distance parallax Pf and the short-distance parallax Pn as a combined parallax P to be used for the distance calculation based on the input comparison result.

The following expression (1) shows determination made by the selecting unit 312.

[Expression 1]

$$\begin{cases} \text{If } Pn < Thp, P = Pf \\ \text{If } Pn \geq Thp, P = Pn \end{cases} \quad (1)$$

When the short-distance parallax Pn becomes lower than the threshold value Thp, the selecting unit 312 determines that detection accuracy by the short-distance parallax Pn decreases, and outputs the long-distance parallax Pf as the combined parallax P. If the short-distance parallax Pn is equal to or higher than the threshold value Thp, the selecting unit 312 continues to select the short-distance parallax Pn as the combined parallax P. The distance calculating unit 313 calculates a distance D based on the combined parallax P and outputs the distance D.

Figure 3:
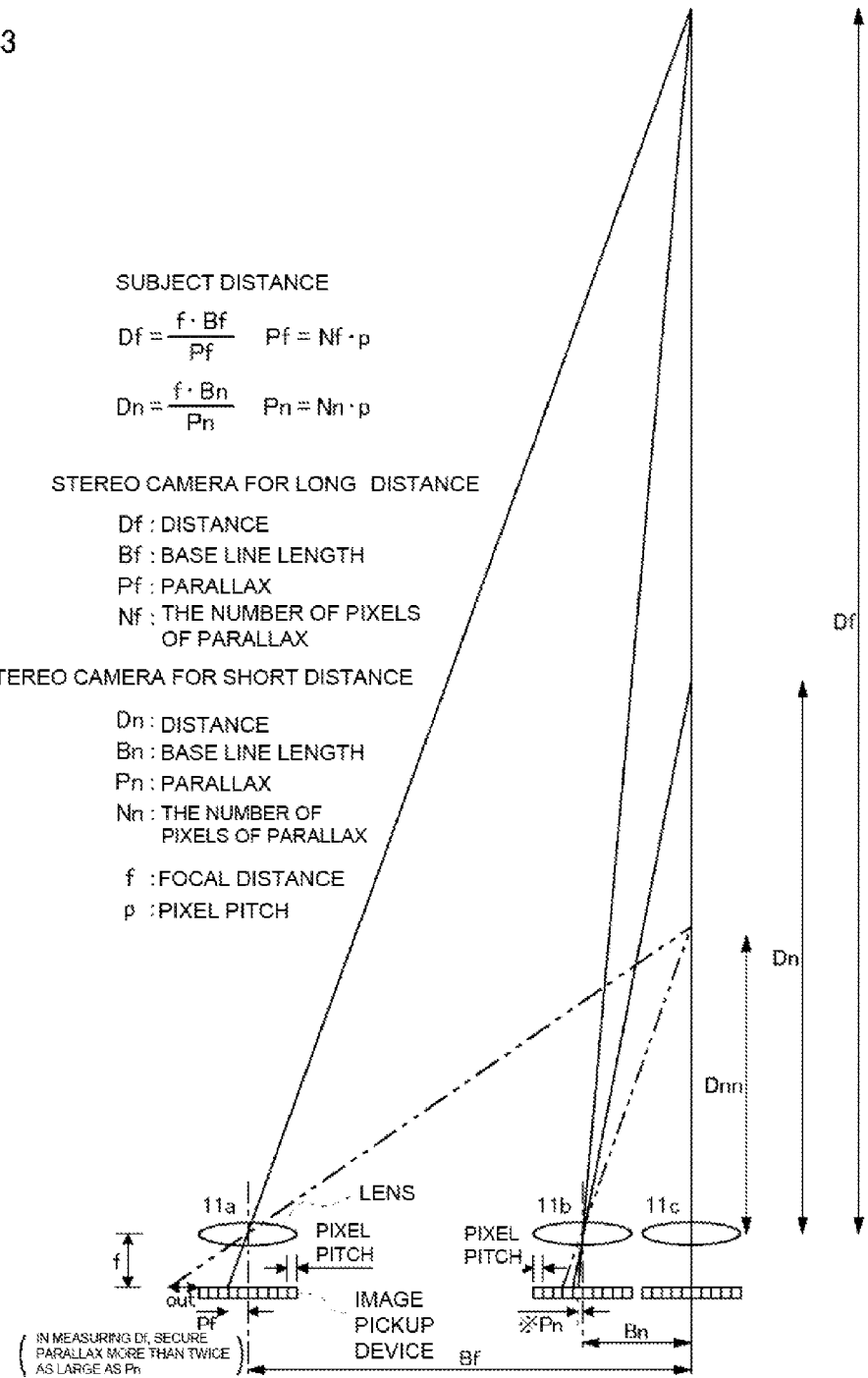
FIG. 3 is a principle diagram of measuring a distance in the first embodiment and a second embodiment.

FIG. 3 is a diagram illustrating a principle of measuring a distance by the stereo image processing apparatus. FIG. 3 shows lenses and image pickup devices as a configuration corresponding to the cameras 11a, 11b, and 11c illustrated in FIG. 1. If it is assumed that a focal distance of the lenses is f, distances to far and near subjects are respectively Df and Dn, base line lengths are Bf and Bn, and parallaxes are Pf and Pn, they are expressed by the following expressions (2) and (3).

[Expression 2]

$$Df = f \cdot Bf / Pf \quad (2)$$

[Expression 3]

$$Dn = f \cdot Bn / Pn \quad (3)$$

Here, the parallaxes Pf and Pn are expressed as $Pf = Nf \cdot p$ and $Pn = Nn \cdot p$ using a pixel pitch p of the image pickup devices and the numbers of pixels of the parallaxes, Nf and Nn. Therefore, as shown in the following expression (4), if the parallax is equal to or lower than the pixel pitch p, the measuring accuracy that is based on the parallax decreases.

[Expression 4]

$$p \cdot i < Pi\_i+1 < p \cdot (i+1) \text{ (wherein i is an integer)} \quad (4)$$

As illustrated in FIG. 3, when the camera 11b and the camera 11c measure a distance, a parallax of one or more pixels can be secured if the distance is the short distance Dn, but when the cameras 11b and 11c measure a long distance Df, the short-distance parallax Pn is equal to or lower than the pixel pitch p (see Pn), and the accuracy of the measuring deteriorates. On the other hand, if the camera 11a and the camera 11c are used, the long-distance parallax Pf obtained when the long distance Df is measured is greater than the above-mentioned short-distance parallax Pn and the parallax accuracy with one or more pixels can be secured.

Thus, as shown in the expression (1), if the long-distance parallax Pf is selected as a combined parallax P when the short-distance parallax Pn is lower than the predetermined threshold value Thp, memories and operating hardware can be reduced and distance image obtaining and three-dimensional object detecting can be achieved with accuracy from long distance through short distance. As an example, to secure the parallax accuracy with one or more pixels as described above, the short-distance parallax Pn can be changed to the long-distance parallax Pf through setting the Thp to 1 for the short-distance parallax Pn.

FIG. 4 is a flow chart showing an operation of the stereo image processing apparatus according to the first embodiment. The stereo image processing apparatus obtains total four images, namely, two images taken by the cameras for long-distance measuring 11a and 11c and two images taken by the cameras for short-distance measuring 11b and 11c within a same exposure period (S10). Then, the stereo image processing apparatus performs the stereo matching between the images output from the two cameras for the long-distance measuring to detect the long-distance parallax Pf (S12), and performs the stereo matching between the images output from the two cameras for the short-distance measuring to detect the short-distance parallax Pn (S14).

Next, the stereo image processing apparatus compares the short-distance parallax Pn with the threshold value Thp to determine whether or not the Pn is lower than the Thp (S16), and if it is determined that the short-distance parallax Pn is lower than the threshold value Thp (yes, in S16), the stereo image processing apparatus uses the long-distance parallax Pf as the combined parallax P and uses the distance Bf as the base line length B (S18). If it is determined that the short-distance parallax Pn is equal to or higher than the threshold value Thp (no, in S16), the stereo image processing apparatus uses the short-distance parallax Pn as the combined parallax P and uses the distance Bn as the base line length B (S20). Then, the stereo image processing apparatus calculates a distance D using the combined parallax P and the base line length B (S22), and writes the distance D into the distance image memory 32 (S24).

The stereo image processing apparatus determines whether or not the distance calculation is completed for all pixels in one frame (S26), and if the calculation is completed (yes, in S26), the processing returns to step S10, where the cameras obtain images of a next frame. On the other hand, if the calculation is not completed (no, in S26), the processing returns to the processing S12 of the stereo matching performed to calculate a distance D with respect to a next pixel. The configuration and the operation of the stereo image processing apparatus according to the first embodiment have been described above.

The stereo image processing apparatus according to the first embodiment can properly generate a distance image by combining a long-distance parallax Pf and a short-distance parallax Pn without using a plurality of distance image memories.

(Second Embodiment)

Next, a stereo image processing apparatus according to a second embodiment will be described. A basic configuration of the stereo image processing apparatus according to the second embodiment is same as the first embodiment. A configuration of a parallax combining unit of the stereo image processing apparatus according to the second embodiment is different from that of the first embodiment.

Figure 5:
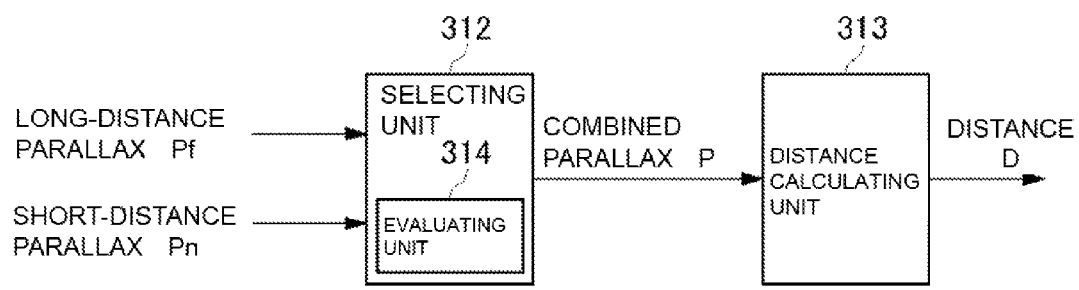
FIG. 5 is a block diagram of parallax combining and distance calculating units in the second embodiment.

FIG. 5 is a diagram illustrating the configuration of the parallax combining unit according to the second embodiment. The selecting unit 312 has a function to select a combined parallax P from input parallaxes Pf and Pn for respectively long and short distances. The evaluating unit 314 evaluates the combined parallax P to determine whether or not the parallax is out of a range of the stereo matching. The selecting unit 312 selects the combined parallax P based on an evaluation result from the evaluating unit 314.

The determination as to whether or not the parallax is out of the range of the stereo matching is carried out based on a difference between image signals used when the long-distance parallax Pf is determined. If a point corresponding to a certain point in the image picked up by the camera 11a (a point in which a same thing as in a certain point is reflected) is not included in the image picked up by the camera 11c, a point having the most similar image signal in the image picked up by the camera 11c is selected as a point in which the difference between the image signals are at a minimum. However, actually, since this point is not a corresponding point, the difference between the image signals is greater than that between correspondence points. In the present embodiment, the stereo image processing apparatus compares the difference between image signals used when the stereo matching is performed with a predetermined threshold value, and if the difference between the image signals is equal to or higher than the predetermined threshold value, the stereo image processing apparatus determines that the combined parallax P is out of the range of the matching.

If it is determined that the combined parallax P is out of the range of the stereo matching, the selecting unit 312 selects and outputs the short-distance parallax Pn to the distance calculating unit 313, and performs the distance measuring using the camera 11b and the camera 11c as illustrated in FIG. 3.

For example, in the distance measuring by using the camera 11a and the camera 11c for the distance Df, the stereo matching can be performed so that the difference between images taken by both the cameras is at a minimum. In contrast, for a short distance Dnn, the camera 11a requires pixels out of the range of an image pick-up area (out), but actually, there are no such pixels. Therefore, the minimum value of the difference between the image signals in the stereo matching is equal to or higher than the predetermined threshold value. In this case, the stereo image processing apparatus can select the short-distance parallax Pn obtained by using the cameras 11b and 11c to use the pixels in the image pick-up area of the camera 11b, so that the high-accuracy matching and measuring can be provided.

It should be noted that in the present embodiment, the method for evaluating a parallax is not limited. In addition, the selecting unit 312 may be controlled by being dynamically switched based on an evaluation of a distance value calculated from parallaxes. Also, the Thp can be set at one pixel or lower.

Figure 6:
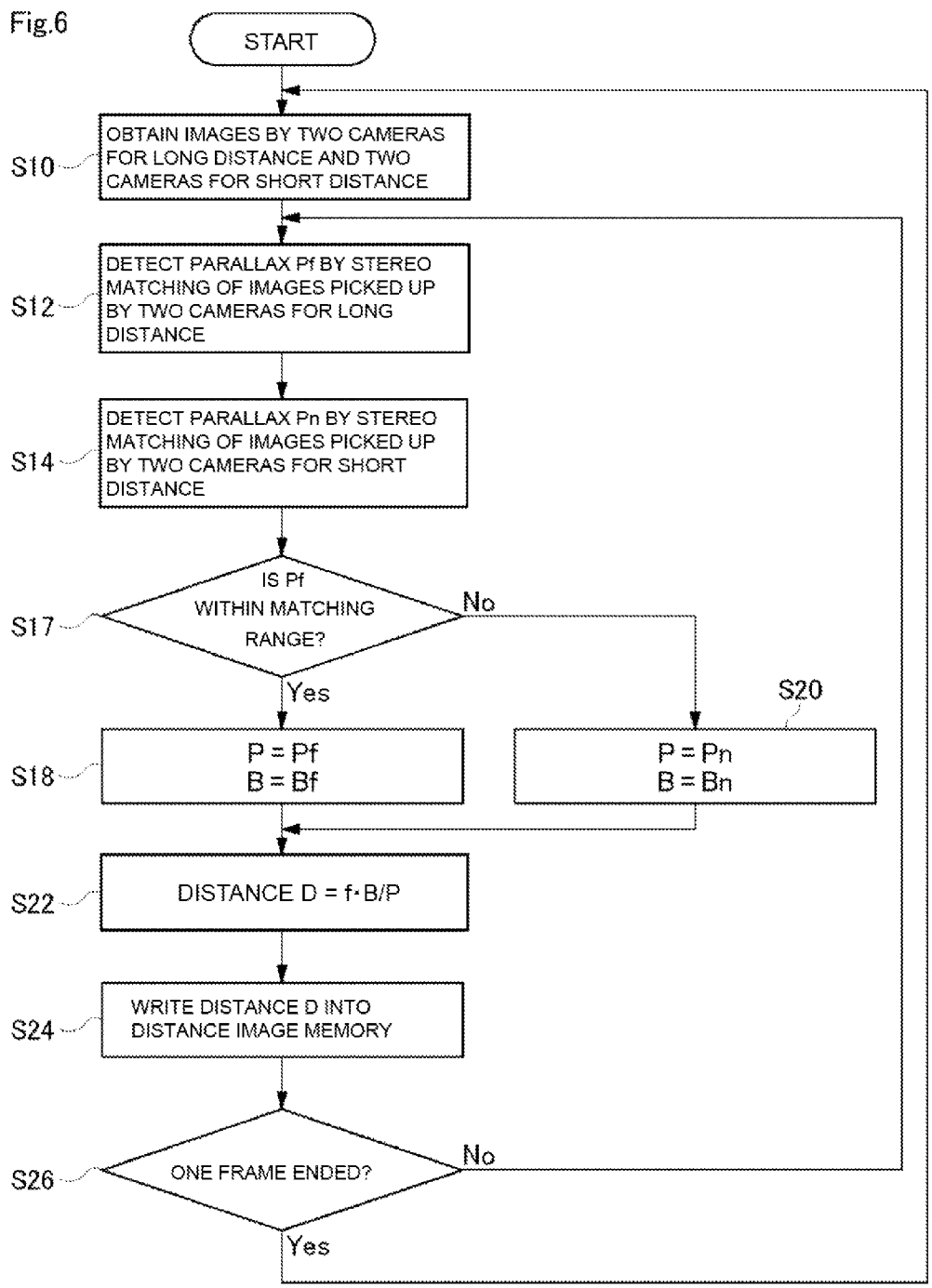
FIG. 6 is a flow chart showing an operation of the stereo image processing apparatus according to the second embodiment.
Figure 7:
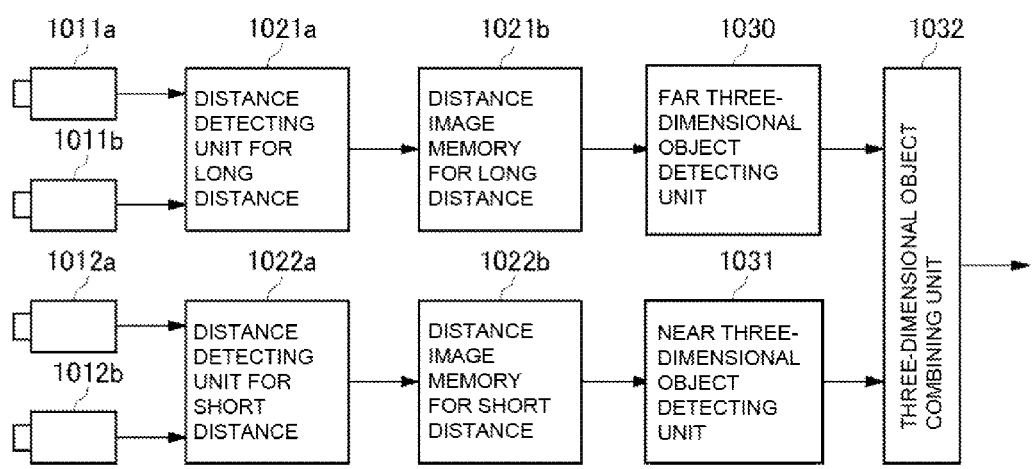
FIG. 7 is a block diagram illustrating a configuration of a conventional stereo image processing apparatus.

FIG. 6 is a flow chart showing an operation of the stereo image processing apparatus according to the second embodiment. A basic operation of the stereo image processing apparatus according to the second embodiment is same as that in the first embodiment, but in the second embodiment, a way to determine a combined parallax P is different from that in the first embodiment. Hereinafter, processing different from that in the first embodiment will be described.

The stereo image processing apparatus according to the second embodiment determines whether or not a long-distance parallax Pf is within a range of matching (S17), and if the parallax is within the range of matching (yes, in S17), the stereo image processing apparatus uses the long-distance parallax Pf as a combined parallax P and uses a distance Bf as a base line length B (S18). If the stereo image processing apparatus determines that the long-distance parallax Pf is not within the range of matching (no, in S17), the stereo image processing apparatus uses a short-distance parallax Pn as the combined parallax P and uses a distance Bn as the base line length B (S20).

As with the first embodiment, the stereo image processing apparatus according to the second embodiment can properly generate a distance image by combining the long-distance parallax Pf and the short-distance parallax Pn without using a plurality of distance image memories.

The preferred embodiments of the present invention that are conceivable at the present time have been described, but various modifications may be made to the present embodiment and all the modifications within the true spirit and scope of the present invention are intended to fall within the scope of the appended claims.

[Industrial Applicability]

The present invention has an advantage that the scale of hardware or software can be reduced as well as high-accuracy measuring can be performed by performing distance calculating after combining a first parallax and a second parallax, and the present invention is useful as a stereo image processing apparatus, a stereo image processing method, and the like.

[Reference Signs List]

11a, 11b, 11c cameras
21 parallax detecting unit for long distance
22 parallax detecting unit for short distance
31 parallax combining unit
32 distance image memory
33 three-dimensional object detecting unit
311 comparing unit
312 selecting unit
313 distance calculating unit
314 evaluating unit
1011a, 1011b CCD cameras for long distance
1012a, 1012b CCD cameras for short distance
1021a distance detecting unit for long distance 1021b distance image memory for long distance
1022a distance detecting unit for short distance
1022b distance image memory for short distance
1030 far three-dimensional object detecting unit
1031 near three-dimensional object detecting unit
1032 three-dimensional object combining unit

The invention claimed is:

1. A stereo image processing apparatus comprising:
a first camera;
a second camera;
a third camera placed between the first camera and the second camera;
a first parallax detecting unit for performing matching between a first image picked up by the first camera and a second image picked up by the second camera to determine correspondence regions in which a difference between image signals is at a minimum for each predetermined unit region and for detecting a deviation between a position in the first image and a position in the second image in the correspondence regions as a first parallax;
a second parallax detecting unit for performing matching between a first image picked up by the first camera and a third image picked up by the third camera to determine correspondence regions in which the difference between image signals is at a minimum for each predetermined unit region and for detecting a deviation between a position in the first image and a position in the third image in the correspondence regions as a second parallax;
a parallax combining unit for combining the first parallax and the second parallax; and
a distance calculating unit for calculating, for each predetermined unit region, a distance to a subject corresponding to the unit region based on the combined parallax.

2. The stereo image processing apparatus according to claim 1, wherein the parallax combining unit comprises:
a comparing unit for comparing the second parallax with a predetermined threshold value; and
a selecting unit for selecting any one of the first parallax and the second parallax based on a comparison result from the comparing unit.

3. The stereo image processing apparatus according to claim 1, wherein the parallax combining unit comprises:
an evaluating unit for acquiring data of the difference between the image signals used when the first parallax is detected by the first parallax detecting unit and for evaluating whether or not the difference between the image signals is equal to or lower than a predetermined threshold value; and
a selecting unit for selecting any one of the first parallax and the second parallax based on an evaluation result from the evaluating unit.

4. A method of using a computer for stereo image processing comprising the steps of:
said computer performing matching between a first image picked up by a first camera and a second image picked up by a second camera to determine correspondence regions in which a difference between image signals is at a minimum for each predetermined unit region and detecting a deviation between a position in the first image and a position in the second image in the correspondence regions as a first parallax;
said computer performing matching between a first image picked up by the first camera and a third image picked up by a third camera placed between the first camera and the second camera to determine correspondence regions in which the difference between image signals is at a minimum for each predetermined unit region and detecting a deviation between a position in the first image and a position in the third image in the correspondence regions as a second parallax;
said computer combining the first parallax and the second parallax; and
said computer calculating, for each predetermined unit region, a distance to a subject corresponding to the unit region based on the combined parallax.

5. The method according to claim 4, wherein the step of combining parallaxes comprises the steps of:
said computer comparing the second parallax with a predetermined threshold value; and
said computer selecting any one of the first parallax and the second parallax based on the comparison result.

6. The method according to claim 4, wherein the step of combining parallaxes comprises the steps of:
said computer acquiring data of the difference between the image signals used when the first parallax is detected in the step of detecting the first parallax and evaluating whether or not the difference between the image signals is equal to or lower than a predetermined threshold value; and
said computer selecting any one of the first parallax and the second parallax based on the evaluation result.

* * * * *